US010928131B2

(12) United States Patent
Krebs (10) Patent No.: US 10,928,131 B2
(45) Date of Patent: Feb. 23, 2021

(54) DRYER AND METHOD OF DRYING (71) Applicant: Force Technology, Brøndby (DK)

(72) Inventor: Niels Krebs, Hellerup (DK)

(73) Assignee: Force Technology, Brøndby (DK)

( * ) Notice: Subject to any disclaimer, the term of this patent is extended or adjusted under 35 U.S.C. 154(b) by 0 days.

(21) Appl. No.: 16/308,656

(22) PCT Filed: Jun. 6, 2017

(86) PCT No.: PCT/EP2017/063648
§ 371 (c)(1),
(2) Date: Dec. 10, 2018

(87) PCT Pub. No.: WO2017/211781
PCT Pub. Date: Dec. 14, 2017

(65) Prior Publication Data
US 2019/0310017 A1   Oct. 10, 2019

(30) Foreign Application Priority Data
Jun. 10, 2016 (DK) .............................. PA2016 70418

(51) Int. Cl.
*F26B 5/02* (2006.01)
*F26B 3/04* (2006.01)
(Continued)

(52) U.S. Cl.
CPC ................. *F26B 5/02* (2013.01); *F26B 3/04* (2013.01); *F26B 11/04* (2013.01); *F26B 21/04* (2013.01);
(Continued)

(58) Field of Classification Search
CPC .... F26B 5/02; F26B 3/04; F26B 11/04; F26B 21/04; F26B 21/08; F26B 21/086; F26B 23/002; F26B 23/005
(Continued)

(56) References Cited

U.S. PATENT DOCUMENTS 4,057,907 A * 11/1977 Rapino ................. A45D 20/46
34/261
4,334,366 A    6/1982 Lockwood
(Continued)

FOREIGN PATENT DOCUMENTS

CN    101094716 A    12/2007
CN    101573486 A    11/2009
(Continued)

OTHER PUBLICATIONS

Written Opinion & International Search Report for PCT Application No. PCT/EP2017/063648 dated Aug. 10, 2017 in 14 pages.
(Continued)

*Primary Examiner* — Stephen M Gravini
(74) *Attorney, Agent, or Firm* — Knobbe, Martens, Olson & Bear, LLP (57) ABSTRACT

A dryer (100), comprising a dryer chamber (101) coupled to a closed loop gas-circulating system for circulating gas through the dryer chamber (101); wherein the closed loop gas-circulating system recirculates the gas and comprises: a compressor (113) coupled to receive return gas from the dryer chamber (101) and to compress the return gas to provide compressed gas; a separator (109) sitting in the gas-circulating system for draining condensate from the gas; and a gas discharger (103; 104) coupled to receive compressed gas from the compressor (113) and to discharge the compressed gas through a discharger exit (118). The separator sits in the closed loop gas-circulating system downstream of the compressor to receive compressed gas and upstream of the gas discharger (103;104). Thereby drying efficacy is improved and is advantageous at relatively low drying temperatures such as below 40 degrees Celsius. There is also provided a door for a dryer, a method of operating a dryer and a method of drying, such as a method (Continued)

of drying pharmaceutical substances, compounds, ingredients or products.

26 Claims, 5 Drawing Sheets (51) Int. Cl.
*F26B 11/04* (2006.01)
*F26B 21/04* (2006.01)
*F26B 21/08* (2006.01)
*F26B 23/00* (2006.01)

(52) U.S. Cl.
CPC ............ *F26B 21/08* (2013.01); *F26B 21/086* (2013.01); *F26B 23/002* (2013.01); *F26B 23/005* (2013.01)

(58) Field of Classification Search
USPC .......................................................... 34/279
See application file for complete search history.

(56) References Cited

U.S. PATENT DOCUMENTS

| | | | | |
|---|---|---|---|---|
| 4,603,489 | A * | 8/1986 | Goldberg | ................ D06F 58/02 34/605 |
| 4,621,438 | A * | 11/1986 | Lanciaux | ................ D06F 58/06 34/77 |
| 4,800,655 | A | 1/1989 | Mori et al. | |
| 5,016,361 | A | 5/1991 | Duerr | |
| 5,724,750 | A * | 3/1998 | Burress | ................ D06F 58/02 34/267 |
| 6,233,844 | B1 | 5/2001 | Gallego Juarez et al. | |
| 6,868,621 | B1 * | 3/2005 | Grimm | ................ D06F 58/10 34/104 |
| 7,665,225 | B2 | 2/2010 | Goldberg et al. | |
| 7,797,854 | B2 * | 9/2010 | Huettlin | ................ B01J 2/16 34/73 |
| 8,650,770 | B1 | 2/2014 | Levy | |
| 9,249,538 | B2 * | 2/2016 | Bison | ................ D06F 58/24 |
| 9,255,732 | B2 * | 2/2016 | Shu | ................ D06F 58/206 |
| 9,422,662 | B2 * | 8/2016 | Caldeira | ................ D06F 58/02 |
| 10,006,721 | B2 * | 6/2018 | Kohavi | ................ D06F 58/24 |
| 2002/0038521 | A1 | 4/2002 | Speck | |
| 2007/0059410 | A1 | 3/2007 | Steffen | |
| 2007/0234586 | A1 | 10/2007 | Huettlin | |
| 2009/0007931 | A1 | 1/2009 | Krebs et al. | |
| 2009/0288910 | A1 * | 11/2009 | Krebs | ................ A23L 3/30 181/175 |
| 2015/0247669 | A1 | 9/2015 | Huber et al. | |
| 2019/0028890 | A1 * | 1/2019 | Park | ................ H04L 63/068 |
| 2019/0310017 | A1 * | 10/2019 | Krebs | ................ F26B 21/08 |

FOREIGN PATENT DOCUMENTS

| | | | |
|---|---|---|---|
| CN | 101849061 A | 9/2010 | |
| DE | 4023518 A1 | 3/1992 | |
| DE | 202005003791 U1 | 7/2006 | |
| EP | 1550829 A1 | 7/2005 | |
| EP | 2617887 A4 * | 7/2017 | ............ F26B 23/005 |
| FR | 2429982 A1 | 1/1980 | |
| JP | S6312390 U | 1/1988 | |
| JP | H0791827 A | 4/1995 | |
| JP | 2005-279257 A | 10/2005 | |
| JP | 2007-319749 A | 12/2007 | |
| RU | 2303220 C1 | 6/2007 | |
| WO | 86/02149 A1 | 4/1986 | |
| WO | 92/01897 A1 | 2/1992 | |
| WO | WO-2006039988 A1 * | 4/2006 | ................ B01J 8/44 |
| WO | 10/003936 A1 | 1/2010 | |
| WO | WO-2017211781 A1 * | 12/2017 | ............ F26B 23/002 |

OTHER PUBLICATIONS

International-Type Search Report for Danish Application No. 201670418, dated Jun. 27, 2016 in 13 pages.

Robert S. Soloff: "Sonic Drying", The Journal of the Acoustical Society of America, vol. 36, No. 5, May 1, 1964, pp. 961-965, XP05534122, New York, NY, US, ISSN: 0001-4966, DOI: 10.1121/1.1919133.

Office Action in Danish Application No. PA 2016 70418, dated Jan. 9, 2017 in 9 pages.

* cited by examiner

DRYER AND METHOD OF DRYING

CROSS-REFERENCE TO RELATED APPLICATIONS

This application is the U.S. National Phase under 35 U.S.C. § 371 of International Application PCT/EP2017/063648, filed Jun. 6, 2017, which claims priority to DK PA201670418, filed Jun. 10, 2016. The disclosures of the above-described applications are hereby incorporated by reference in their entirety.

BACKGROUND OF THE INVENTION

Drying is a mass transfer process involving the removal of water or another liquid by evaporation from a solid, semi-solid or liquid item(s) or object(s) to be dried. This process is often used in industry as a production step before packaging of products or in connection with professional or private drying of clothes. A source of heat and an agent to remove the vapour produced by the process are often involved. In bio-products like food, grains, and pharmaceuticals like vaccines, the liquid to be removed is often water.

In the most common case, a gas stream, e.g. a stream of air, applies heat to the object(s) to be dried by natural or forced convection, in the latter case e.g. by means of a blower, and carries away the vapour as humidity. This stream of gas is also denoted a dehydrating medium.

Other possibilities are vacuum drying, where heat is supplied by conduction or radiation (or microwaves), while the vapour thus produced is removed by the vacuum system. Another indirect technique is drum drying (used, for instance, for manufacturing potato flakes), where a heated surface is used to provide the energy, and aspirators draw the vapour outside the drum. As an example, U.S. Pat. No. 5,016,361 describes a vacuum dryer.

In some products having relatively high initial moisture content, an initial linear reduction of the average product moisture content as a function of time may be observed for a limited time, often known as a "constant drying rate period". Usually, during this period, it is surface moisture outside individual particles that is being removed. The drying rate during this period is mostly dependent on the rate of heat transfer to the material being dried. Therefore, the maximum achievable drying rate is considered to be heat-transfer limited. If drying is continued, the slope of the curve, the drying rate, becomes less steep (falling rate period) and eventually tends to nearly horizontal at very long times. The product moisture content is then constant at the "equilibrium moisture content", where it is, in practice, in equilibrium with the dehydrating medium. In the falling-rate period, water migration from the product interior to the surface is mostly by molecular diffusion, i.e. the water flux is proportional to the moisture content gradient. This means that water moves from zones with higher moisture content to zones with lower values, a phenomenon explained by the second law of thermodynamics.

Air heating increases the driving force for heat transfer and accelerates drying. It also reduces relative humidity, further increasing the driving force for drying. In the falling rate period, as moisture content falls, the solids heat up and the higher temperatures speed up diffusion of water from the interior of the solid to the surface. However, product quality considerations limit the applicable rise to air temperature. If one attempts to increase the rate of moisture removal by increasing the temperature of the drying gas, there is significant risk of over-drying the products. Increased temperature of the drying gas can almost completely dehydrate the solid surface, so that its pores shrink and almost close, leading to crust formation or "case hardening", which is usually undesirable. Excessively raising the temperature leads to scorching the products which is almost always unacceptable.

Thus the efficiency of drying is proportional to the temperature of the drying gas. However, crust formation or "case hardening" may set a practical upper limit for the gas temperature and may be as low as 25° C. Product scorching or burning also set a practical upper limit for the gas temperature and may be somewhat higher than 25° C., but as low as 50° C. Other undesired effects may set an upper, but relatively low, limit for the gas temperature. Such undesired effects may e.g. be the inhibiting of antioxidants such as vitamin C or E that removes potentially damaging oxidizing agents in a living organism. To avoid inhibiting of antioxidants temperatures must be kept lower than about 40° C.

RELATED PRIOR ART

A drum dryer for drying nuts or other products using hot sonic energy generated by a pulse gas jet engine is disclosed in U.S. Pat. No. 4,334,366. This type of dryer involves a significant risk of burning the products and different systems are applied in this type of dryer to circumvent this problem. Further, this type of dryer involves the problem that the pulse gas jet engine produces exhaust gasses that inevitably are conveyed with the hot air when it passes the products. Thus, there is a risk of contaminating the products by unhealthy exhaust gasses.

U.S. Pat. No. 4,334,366 also discloses that rotary dryers are used today for drying of nuts and other commodities. In one commercial application, the nuts are introduced into a horizontal cylindrical drum, which is rotated about its horizontal axis to tumble the nuts. The drum is perforated, and hot gas from a conventional source, such as gas burners, is introduced from under the drum, flows through the perforations, and contacts the tumbling nuts for drying.

Another class of dryers, such as disclosed in WO 10/003936, comprises a heat pump type clothes dryer with a drum wherein laundry to be dried is emplaced. The dryer comprises an air circulating duct wherein the drying cycle air is circulated, an evaporator disposed in the air circulation duct, cooling and reducing the humidity of the warm and humid air that comes from the drum and passes through it, and a condenser heating the low-humid air coming through the evaporator. A refrigerant flow loop runs through the evaporator and the condenser driven by a compressor that increases the temperature and pressure of the refrigerant. Waste heat is collected from the compressor in the refrigerant flow loop and is utilized in order to heat the drying air in the air circulation duct. In this type a primary flow of circulating air is heated and dehydrated involving a heat-pump that uses a secondary flow of the refrigerant. The compressor compresses the refrigerant in the refrigerant flow loop of the heat pump. Other examples of dryers with a heat pump using a compressor in a conventional way are described in U.S. Pat. Nos. 4,800,655, 7,665,225, JP 2005/279257, and WO 86/02149.

U.S. Pat. No. 8,650,770 discloses drying of wet objects using a tumbler with an inlet and an outlet for passing air through wet objects in the tumbler to absorb moisture from the objects. Air from the outlet of the tumbler is fed to a compressor that adiabatically compresses the air, thereby heating it, and then the compressed air is lead through the hot side of a heat exchanger, thereby cooling it, before the compressed air is discharged and expanded by means of a turbine, whereby the air is cooled further, below its dew point. Before reaching the tumbler, via its inlet, the cooled and expanded air is lead through a cyclone separator for withdrawing condensate (water) from the air and then heated by means of the hot side of the heat exchanger and an additional heater. Thus, a closed-loop configuration for gradually withdrawing condensate from the air circulated in the closed loop is provided, hence gradually extracting moisture from wet objects.

Figure 2:
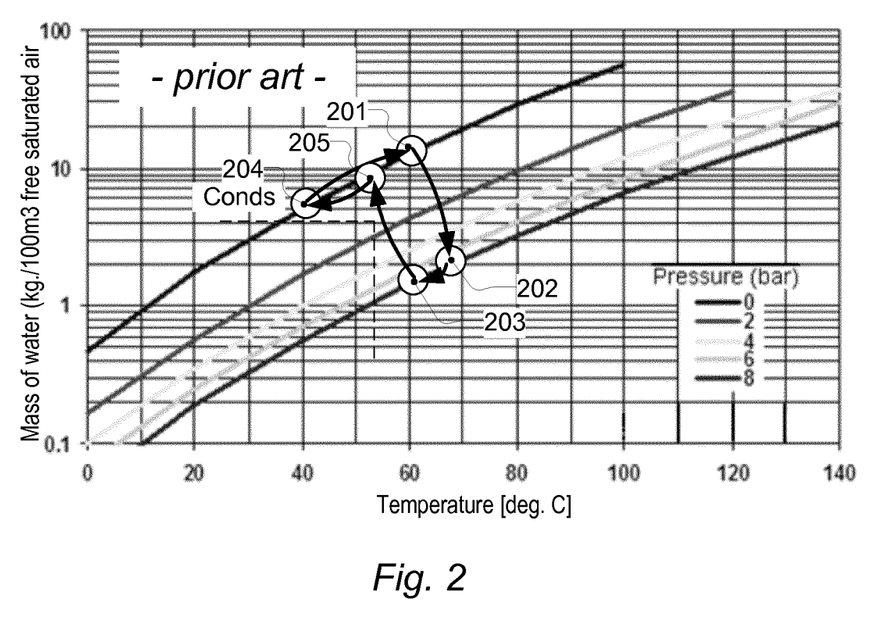
FIG. 2 shows an operation diagram for a prior art dryer.

An operation diagram for the drying disclosed in U.S. Pat. No. 8,650,770 is shown in FIG. 2. From this operation diagram it can be seen that return air, from the dryer chamber, is received at operation point 201, at an exemplary temperature of 60 deg. Celsius. The return air is then compressed, which may increase temperature of the return air slightly such that operation point 202 represents the state of compressed air output from the compressor. Due to a heat exchanger coupled between the compressor and the turbine, the temperature drops to a lower temperature at operation point 203, before the compressed air is discharged in the turbine, whereby an operation point at or close to point 205 represents the discharged air at a much lower pressure such as at atmospheres pressure. A further heat exchanger, coupled to a coolant, then lowers the temperature to point 204, while at a discharged pressure, whereat a separator drains condensate from the air. A heater then increases the temperature of the air which is led back to the dryer chamber. However, it remains a problem to improve the efficacy of such a prior art dryer.

FR 2,429,982 describes drying of wet objects using a drying chamber with an inlet and an outlet for passing air through wet objects in the drying chamber to absorb moisture from the objects. Air from the outlet of the drying chamber is fed via a condenser to a compressor that compresses the air and recirculates the air back to the drying chamber via a heater. However, also for this type of dryer it remains a problem how to improve the efficacy.

It should be noted that, in contrast to the other prior art dryers mentioned above, U.S. Pat. No. 8,650,770 and FR 2,429,982 describe a compressor arranged to compress air that has been circulated across the items to be dried i.e. the air involved in the drying cycle.

SUMMARY

There is provided a dryer, comprising: a dryer chamber coupled to form a closed loop gas-circulating system for circulating gas through the dryer chamber; wherein the closed loop gas-circulating system recirculates the gas and comprises: a compressor coupled to receive return gas from the dryer chamber and to compress the return gas to provide compressed gas; a separator sitting in the gas-circulating system for draining condensate from the gas; and a gas discharger coupled to receive compressed gas from the compressor and to discharge the compressed gas through a discharger exit; wherein the separator sits in the closed loop gas-circulating system downstream of the compressor, to receive the compressed gas from the compressor, and upstream of the gas discharger.

Thereby an improved dryer is provided. The dryer provides a supply of gas, such as air, to wet or humid items (also denoted objects) which absorb moisture from the wet or humid items and subsequently is evacuated as return gas.

The separator, which may be of a cyclone type or a float-operated drain valve or another type, is configured to drain condensate from the gas at a location in the closed loop gas-circulating system after the compressor and before the gas discharger i.e. at a location where the gas is in a compressed state, before it is discharged and the pressure drops. Thus, the separator is arranged at the pressure side of the compressor to receive the pressurized gas from the compressor. The separator is also denoted a gas-liquid separator, an air-vapour separator or a gas-vapour separator. The gas discharger may also be denoted an expander or a gas expander.

The gas may be atmospheric air.

Thereby efficacy in terms of the mass of condensate per volume unit that can be extracted from wet or humid items subject to drying in the dryer chamber is increased when compared to a prior art dryer. Further, it is thereby possible to dry wet or humid items at lower temperatures such as at temperatures below 40-50 degrees Celsius e.g. below about 38 degrees Celsius or below about 40 degrees Celsius.

Figure 3:
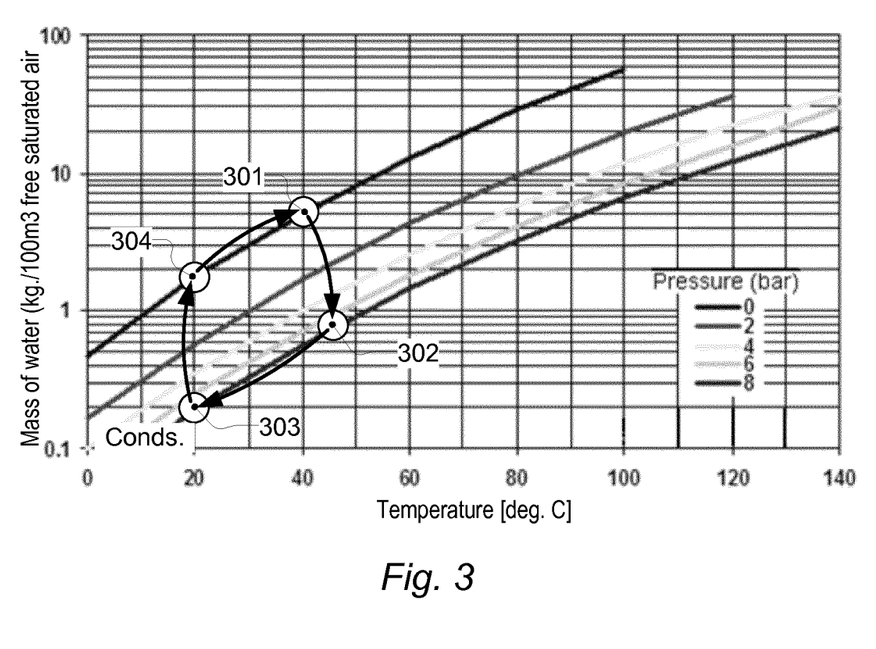
FIG. 3 shows an operation diagram for an improved dryer.

Compared to a prior art dryer, illustrated with respect to FIG. 2, the improved dryer operates according to an operation diagram as shown in FIG. 3. The operation diagram shown in FIG. 3, illustrates by point 301 that return air, from the dryer chamber, is received at an exemplary temperature of 40 degrees Celsius. The return air is then compressed, which may increase temperature of the return air slightly such that operation point 302 represents the state of compressed air output from the compressor.

As claimed, while the gas, e.g. air, is in a compressed state, condensate is drained from the compressed gas; this operation point, when condensate is drained is illustrated by operation point 302. As a consequence of condensate being drained from the compressed gas efficacy in terms of the mass of condensate per volume unit that can be extracted from wet or humid items subject to drying in the dryer chamber is increased as a function of the pressure of the compressed air, which for a pressure of about 8 bar yields an improvement of approximately a decade, i.e. about 10 times. For a pressure of about 2 bar an improvement of about 4 times may be achieved. This improvement in efficacy holds true for comparable temperatures.

The compressed gas—measured at an outlet of the compressor—has a pressure of more than about 1.5 bar, such as more than about 1.7 bar or more than about 2 bar, e.g. more than about 3 or more than about 4 bar. The compressed gas from the compressor—measured at an inlet to the separator—has substantially the same pressure as the compressed gas measured at the outlet of the compressor. Thus, there is substantially no pressure drop in the closed loop from the compressor to the separator. Only after the separator, at the gas discharger, the pressure drops eventually.

Return gas is a relatively humid gas escaping from the dryer chamber via a gas outlet thereof. Return gas is led to the compressor e.g. via a pipe, tube, hose or duct or a combination thereof.

A compressor is a mechanical device that increases the pressure of a gas, which is compressible, supplied via an inlet to the compressor by significantly reducing its volume at an outlet of the compressor.

The compressor may be e.g. a rotary screw type compressor, a piston compressor, a reciprocating compressor, a rotary sliding vane compressor, a rocking piston compressor, a centrifugal compressor, a rotary lobe compressor, an axial flow compressor or a combination thereof. Other types of compressors may be used.

As for the axial flow compressor and other types of compressors it should be mentioned that so-called 'stators' help the axial compressor keep the air flowing and properly pressurized. Reciprocating and piston compressors increase the pressure of the incoming gas by reducing its volume by means of a displacing component. Rotary screw type compressors, at least in some embodiments, have rotors that interact to compress the gas continuously.

The centrifugal compressor uses a rotating disk or impeller in a shaped housing to force the gas to the rim of the impeller, increasing the velocity of the gas. A diffuser (divergent duct) section converts the velocity energy to pressure energy.

Conventionally, a compressor comprises or is integrated with a motor, which may be an electric motor or another type of motor. Contrary to a blower or ventilator, a compressor comprises a first displacing member which by its rotation or reciprocation compresses a gas, supplied via a compressor gas inlet, by interacting with a stator or second displacing member to compress a volume of gas into the compressed gas, which is supplied via a compressor gas outlet. The compressed gas is transported, in its compressed state, to remain compressed while condensate is separated from the gas by the separator and until the compressed gas is discharged at the gas discharger. It should be noted that since condensate is withdrawn from the compressed gas, there may be a—negligible—pressure drop at the separator.

The compressor receives the return gas and provides compressed gas by adiabatic compression. By 'adiabatic compression' is understood that a gas is mechanically compressed while the temperature of the gas thereby increases. Correspondingly, by 'adiabatic expansion' is understood that the compressed gas is discharged to expand to a larger volume while its temperature decreases.

Compressed gas is led to the separator, wherein condensate is drained from the compressed gas. By the term 'drained from' is meant that condensate is separated from the compressed gas. The condensate is removed from the closed loop.

Compressed gas is output from the separator via a gas outlet and drained condensate is output at a condensate outlet. A condensate drain pipe may be coupled to the condensate outlet to guide the condensate to a drain or tank.

It should be understood that the closed loop gas-circulating system involves a low/normal pressure path extending from the gas discharger to the compressor and a high-pressure path extending from the compressor to the discharger. The system is a closed-loop system in the sense that no venting or forced mixing with surrounding air takes place.

The low/normal pressure path comprises the dryer chamber and a duct coupling return air from the dryer chamber back to an inlet of the compressor. The dryer chamber and duct may be tight and sealed to normal pressure standards to avoid significant leakage of gas or mixing of gas with air from the surroundings. Thus, the dryer chamber is not pressurized. By "not pressurized" should be understood however that there may be a slight over pressure or under pressure in the chamber. The high-pressure path comprises compressed air piping or compressed air pipes or compressed air hose(s) running from the compressor to the separator and from the separator to the gas discharger. Optionally, additional components may be involved in one or more of the low/normal pressure path and the high-pressure path. It is appreciated that the closed loop gas circulating system doesn't leak gas significantly and doesn't take in significant amount of free air while drying.

In some aspects the dryer comprises one or more gas dischargers with one or more respective exits.

The dryer may be used for a variety of items or objects such as clothes, woven or non-woven fabrics, food products, raw materials, building materials etc.

In some embodiments the gas discharger is arranged with its discharger exit inside the dryer chamber to provide supply gas which discharges inside the dryer chamber.

Especially, when the gas discharge takes place inside the dryer chamber an improved gas flow inside the dryer chamber and across the wet or humid items may be observed compared to conventional forced circulation of a gas such as air.

The supply gas has a relatively low pressure, such as close to atmospheric pressure, after it has left the discharger and is supplied to the discharger at a relatively high pressure such as at above 2 bar, or 3 bar or 4 bar e.g. about 8 bar. The supply gas is relatively dry compared to the return gas and is relatively dry when compared to prior art supply gas.

A gas discharger may comprise a pipe opening e.g. a pipe opening with a restricted opening, a nozzle or diffuser. As mentioned further below gas discharger may be configured as a sound generator e.g. a static siren.

In some embodiments the gas discharger is configured as a sound generator, coupled to receive the compressed gas and therefrom generate high intensity sound waves that are emitted inside the dryer chamber with discharge of the compressed gas through the discharger exit.

Thereby the discharger exit emits the high intensity sound waves as output from the sound generator and at the same time provide a supply of gas to the drying chamber. High intensity sound waves may have the effect of disrupting a boundary sub-layer surrounding the wet or humid items subject to drying and thereby increase the rate of drying. Drying is conventionally prolonged by a thin protective layer of air or another gas very closely surrounding the items. Such a thin protective layer of air or another gas very closely surrounding the items is also denoted a boundary sub-layer. It has been found that disruption of this boundary sub-laminar layer by high intensity sound pressures improves the rate of drying the wet or humid items. Disruption of this boundary sub-laminar layer by high intensity sound pressures at frequencies above 10 KHz especially improves the rate of drying the wet or humid items.

In some aspects said high intensity and high power acoustic waves are acoustic waves at frequencies above about 10 KHz. In some aspects said high intensity and high power acoustic waves are ultrasonic acoustic waves. Ultrasonic frequencies may be defined as frequencies in the range about 20 KHz to about 50 KHz, e.g. above about 20 KHz or above 22 KHz.

In some aspects said high intensity and high power acoustic waves are generated by a high intensity and high power acoustic wave generator and has an acoustic sound pressure level at approximately 10 cm from an exit of said generator (100) selected from the group of:
  at least 130 dB,
  at least 133 dB,
  at least 136 dB,
  approximately 130 to approximately 165 dB, and
  approximately 130 to approximately 180 dB.

The exit of the sound generator is also denoted an orifice.

In some aspects high intensity sound or ultrasound is generated by a sound generator of the Hartmann type generator and wherein the pressurized gas is supplied to the sound generator at a pressure in the range of 1.5-5 bar.

Thereby it is possible to achieve a sound pressure level greater than 130 dB, e.g. 132 dB, 134, dB, 136 dB, and up to the highest possible sound pressure achievable, which is approximately 170-180 db. The pressure may be selected to generate a sound pressure in the range of 130-160 dB, above which there is a saturation of the disruptive effect on the boundary sub-laminar layer.

In some embodiments the sound generator is a static siren, such as a Hartmann generator or a Lavavasseur whistle or generators or whistles based on the principle of a Hartmann generator or Lavavasseur whistle, generating high intensity sound when driven by the compressed air.

In some embodiments the separator is a gas/liquid separator.

The gas/liquid separator may be selected from the group of: the cyclone type separator, a thermal gas/liquid separator, and a float-valve gas/liquid separator. In case the wet or humid items have absorbed water, the condensate is water.

The separator takes out water from the pressurized gas, while the pressure of the gas led out of the separator remains substantially the same as the pressure of the gas led into the separator or at least without causing a significant drop in pressure.

In some embodiments the dryer comprises a heat exchanger with a first heat exchanger path sitting in the closed loop air-circulating system between the compressor and the separator.

In some aspects the heat exchanger is coupled to cool the compressed gas flowing through the first heat exchanger path by a forced or natural flow of atmospheric air passing the first circuit. Thereby cooling may be achieved using atmospheric air at 'room temperature' without means actively cooling the atmospheric air. In this respect cooling is a lowering of temperature down towards 'room temperature'. The heat exchanger may be configured with 'ribs' or 'cooling ribs' for effectively coupling the first heat exchanger path with atmospheric air passing the ribs. 'Room temperature' may be about 20° C.; it may be an air temperature measured inside or in proximity of the heat exchanger.

In some embodiments the dryer comprises a second heat exchanger path operatively coupled for exchange of heat energy with the first heat exchanger path; wherein the second circuit is coupled to a supply of a cooling liquid.

Thereby, the mass of condensate that can be drained by means of the separator is improved. This improvement is especially distinct at relatively low temperatures of the compressed gas such as at temperatures below 40-50 degrees Celsius. This effect may also be seen from FIG. 3, cf. the transition towards lower temperature from operation point 302 to operation point 303. For a temperature drop of 25 degrees Celsius, of the compressed gas, the improvement may amount to about 30%.

In some aspects the cooling liquid is pumped or otherwise actively forced through the second circuit. In some aspects the supply of cooling liquid is actively cooled to a temperature below a room temperature.

The cooling liquid may be ground water, tap water or another liquid which may be liquid in an open circuit or a circulated liquid in a closed or semi-closed liquid loop.

In some embodiments the dryer comprises a heater installed inside the dryer chamber and being operatively controlled by a temperature controller to maintain a temperature inside the dryer chamber at a set temperature or within a temperature range.

The heater may be an electric heater e.g. a heater known from conventional tumble dryers such as a heater operated from a mains supply. The heater may be a heater driven by hot water or warm water, such as by water from a central heating installation or from district heating.

In some embodiments the dryer comprises a heater installed at a location downstream of the separator and upstream of the gas discharger to heat compressed air flowing from the separator to the gas discharger, and being operatively controlled by a temperature controller to maintain a temperature inside the dryer chamber at a set temperature or within a temperature range.

The heater may heat the compressed gas at one or more locations e.g. immediately after the separator, or immediately before the gas discharger or at a location there between.

In some embodiments the dryer comprises a heat pump with: a first heat pump gas path sitting in the closed loop gas-circulating system between the compressor and the separator; and a second heat pump gas path sitting in the closed loop gas-circulating system between the separator and the gas discharger; wherein the heat pump is configured with a heat pump circuit for extracting heat energy from the first heat pump gas path and delivering heat energy to the second heat pump gas path.

The heat pump may an active heat pump comprising a compressor that drives the heat pump circuit. The heat pump circuit circulates a heat exchanging medium such as a refrigerant.

The heat pump serves a dual purpose of cooling the compressed gas prior to being delivered to the separator and thereby extracting heat energy that is delivered to the compressed gas at a location where condensate is drained.

Thereby the operation point at which condensate is drained is moved to a lower temperature which in turn serves to extract more condensate mass and thereby improve drying. This operation point corresponds, with reference to FIG. 3, to operation point 303.

In some embodiments the dryer comprises a door which when closed seals the interior of the dryer chamber from the outside, and which, when open, provides access to the drying chamber for loading or unloading of items into/from the dryer chamber; wherein the gas discharger is installed in or attached to the door with its discharger exit inside the dryer chamber, when the door is closed, to provide supply gas which discharges inside the dryer chamber.

In some aspects the gas discharger is configured as a sound generator, such as a static siren, coupled to receive the compressed gas and therefrom generate high intensity sound waves that are emitted inside the dryer chamber with discharge of the compressed gas through the discharger exit. Compressed gas may be supplied to the gas discharger by means of a compressed gas hose which is sufficiently flexible to enable the door to be opened and closed freely. Multiple gas dischargers may be interconnected by compressed gas tubing.

In some embodiments, the door is configured to be retrofitted to a conventional tumble dryer or other type of dryer. In some embodiments, a unit carrying the gas dischargers is configured to be retrofitted to a conventional tumble dryer door.

In some embodiments the unit is configured as a lance that extends into the dryer chamber at least when the door is closed. Thereby, e.g. when the dryer comprises a drum, it is possible to reach out closer to the wet or humid items in the dryer chamber or drum as the case may be.

In some aspects the lance sits on a stand such as a stand on wheels.

In some embodiments the drying chamber accommodates a motorized drum. The motorized drum may be a perforated drum whereby heat from a heat source outside the drum may reach wet or humid items inside the drum.

In some embodiments there is provided a dryer according to any of the above claims, wherein the drying chamber accommodates one or more of shelfs and supports for carrying trays or shelfs.

There is also provided a door for a dryer and for, when closed, seals the interior of the dryer from the outside, and which when open provides access to the drying chamber for loading or unloading of items into/from the dryer chamber; wherein the gas discharger is installed in or attached to the door with its discharger exit inside the dryer chamber, when the door is closed, to provide supply gas which discharges inside the dryer chamber.

There is also provided a method of operating a dryer according to any of the preceding claims, comprising operating the compressor to generate the compressed gas at a pressure selected from the group of ranges comprising: the range above 2 bar, the range above 4 bar, the range above 6 bar and the range above 8 bar.

In some embodiments a temperature inside the dryer chamber is kept at a temperature below 50 degrees Celsius or below 42 degrees Celsius or below 37 degrees Celsius.

In some embodiments the method of operating a dryer comprises operating the compressor to generate a sound pressure of more than 130 dB or more than 133 dB or more than 136 dB or more than 139 dB.

In some embodiments the method of drying comprises: adiabatically compressing a gas returned via a duct from a dryer chamber to provide a compressed gas; draining condensate from the compressed gas, while the gas is in a compressed state to provide compressed supply gas; and discharging the compressed supply gas inside the dryer chamber. By 'adiabatically compressing a gas' is understood that a gas is mechanically compressed while the temperature of the gas thereby increases. Correspondingly, by 'adiabatically expanding a gas' is understood that the compressed gas is discharged to expand to a larger volume while its temperature decreases.

In some embodiments the compressed gas is generated at a pressure selected from a group of ranges comprising: the range above 2 bar, the range above 4 bar, the range above 6 bar and the range above 8 bar.

In some embodiments a temperature inside the dryer chamber is kept at a temperature below 50 degrees Celsius or below 42 degrees Celsius or below 37 degrees Celsius. The temperature inside the dryer chamber may be kept at a pre-set temperature by controlling, such as by on-off switching, a heater arranged, e.g. as described herein, to heat the gas inside the dryer chamber or by controlling, such as by on-off switching, a heat exchanger or heat pump arranged e.g. as described herein.

In some embodiments the method of drying comprises generating a sound pressure of more than 130 dB or more than 133 dB or more than 136 dB or more than 139 dB inside the dryer chamber.

Here and in the following, a compressor is a mechanical device that increases the pressure of a gas such as air adiabatically by reducing its volume. The compressor may be of the dynamic type, such as a centrifugal compressor or an axial compressor, or of the displacement type, such a reciprocating compressor or a rotary compressor. A reciprocating compressor may generate compressed gas by moving a diaphragm or piston. A rotary compressor may be of the lobe type, screw type, liquid ring type, scroll type or vane type. The compressor is of a type generating a pressure of at least 2 bar, at least 2.5 bar or at least 4 bar such as 6 bar, and 8 bar e.g. up to 10 bar. The compressor may be operated by an electrical motor operating on electrical power.

There is also provided a method of drying food products according to the method set out above. Food products which may be dried according to the method of drying food products comprise e.g. berries, nuts, fruit, vegetables, spices, herbs and meat, but is not limited thereto.

There is also provided a method of drying pharmaceutical substances, compounds, pharmaceutical ingredients, pharmaceutical products or pharmaceutical intermediate products according to the method set out above.

There is also provided use of the dryer set out above for drying food products, pharmaceutical substances, pharmaceutical compounds, pharmaceutical ingredients, pharmaceutical products or pharmaceutical intermediate products.

BRIEF DESCRIPTION OF THE FIGURES

A more detailed description follows below with reference to the drawing, in which.

DETAILED DESCRIPTION

Figure 1:
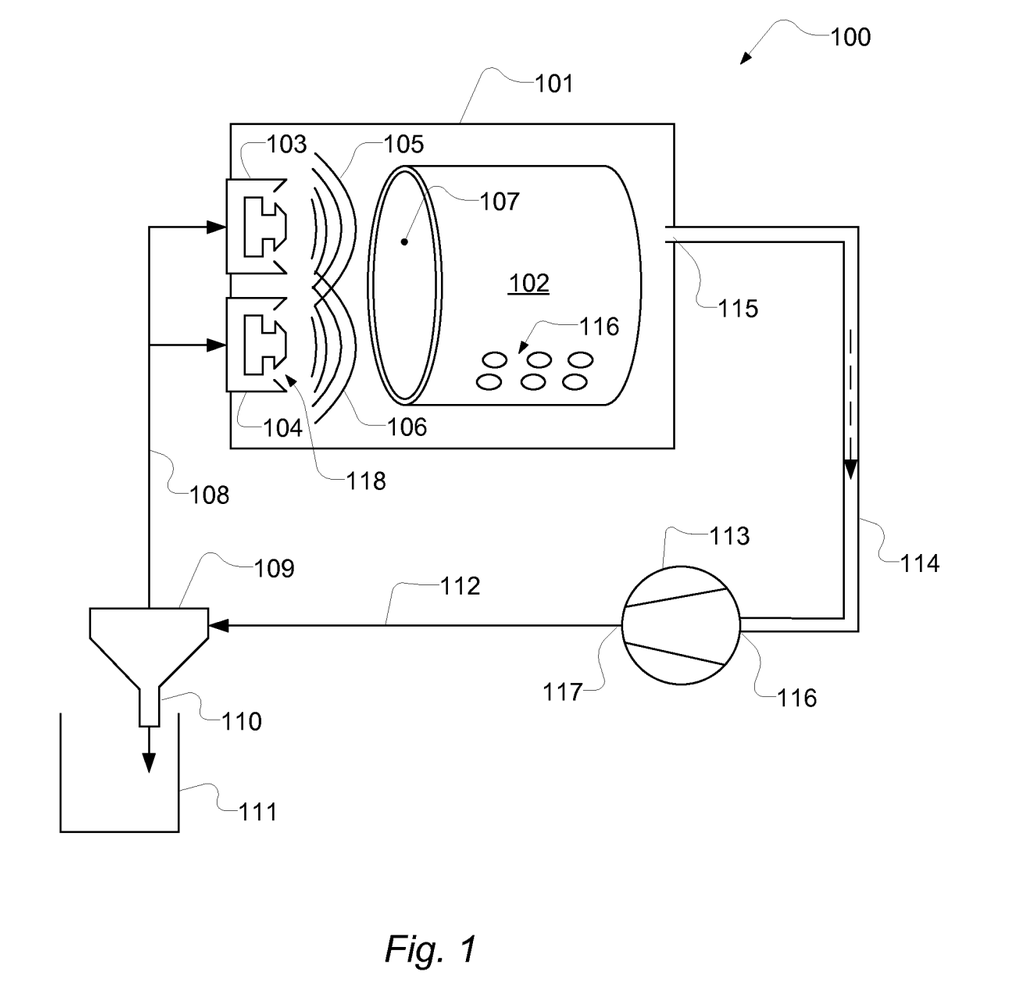
FIG. 1 shows a first embodiment of a dryer.

FIG. 1 shows a first embodiment of a dryer. The dryer designated by reference numeral 100, comprises a dryer chamber 101 with a drum 102 with perforations 116 and is coupled to form a closed loop gas-circulating system for circulating gas, such as atmospheric air, through the dryer chamber 101. The gas may comprise additives for treatment of the wet or humid items to be dried.

The closed loop gas-circulating system recirculates the gas and comprises a compressor 113 coupled to receive return gas from the dryer chamber 101 via a gas outlet 115 of the dryer chamber 101 and via a duct 114 coupled to the outlet 115. The duct is configured to guide a flow of return gas to a compressor intake 116 of the compressor 113 to compress the return gas to provide compressed gas. The compressed gas is provided at a compressor outlet 117 of the compressor 113 Return gas is a relatively humid gas escaping from the dryer chamber via the gas outlet 115 and the duct 114.

The compressor outlet 117, supplying compressed gas from the compressor 113, is coupled to a compressed gas pipe 112, which supplies compressed gas to the separator 109. The separator, which may be of a cyclone type or a float-operated drain valve or another type, is configured to drain condensate from the gas at a location in the closed loop gas-circulating system after the compressor and before the gas discharger i.e. at a location where the gas is in a compressed state, before it is discharged and the pressure drops. The separator is also denoted an air-vapour separator or a gas-vapour separator. The separator has an outlet 110 through which condensate escapes. Condensate may be led to a reservoir 111 or a sewer.

Pressurized gas from the separator 109 is led to gas dischargers 103; 104 in the form of sound generators from the class of Hartmann generators or Lavavasseur whistles. Thereby the pressurized is gas is expanded inside the dryer chamber through an exit 118 while generating a high intensity sound pressure. The sound generators may deliver a sound pressure above 130 dB such as 135 dB or above at frequencies above about 10 KHz. In some embodiments the sound generators are configured to generate high intensity sound waves 105, 106 at ultrasonic frequencies. The gas is delivered via the separator 109 and a compressed gas pipe 108, which may be branched to two or more gas dischargers. In some embodiments, the pressurized gas from the separator 109 is discharged by a gas discharger with a constriction providing a gas discharge opening which has a reduced cross-section compared to a cross section of the compressed gas pipe 108. The gas discharger may generate noise, but may not be a sound generator. A sound generator may be distinguished over other types of gas dischargers by generating (distinct) tones. A gas discharger may have one or more openings for the discharge of gas.

Thus, the gas dischargers 103, 104 delivers a flow of an expanding gas—a supply gas—to wet or humid items (also denoted objects) which absorbs moisture from the wet or humid items in the drum 102. The gas is then evacuated from the dryer chamber as return gas and is led back to the compressor 113. The gas may be evacuated by one or more of suction by the compressor 113, natural convection or forced convection.

It should be noted in connection with this embodiment and other embodiments described in the present specification that the dryer chamber 101, may be configured with one or more trays or shelfs (not shown) or supports for one or more trays or shelfs for carrying the items instead of the drum 102 or in addition thereto.

FIG. 2 shows an operation diagram for a prior art dryer. This operation diagram is also described above. The ordinate axis of the diagram represents temperature in degrees Celsius and the abscissa represents the mass of water in Kg per 100 m$^3$ of free saturated air on a logarithmic scale. The shown family of five curves represents in order, from above, a pressure of 0 bar, 2 bar, 4 bar, 6 bar and 8 bar. Exemplary points of operation are referred to by reference numerals 201, 202, 203, 204 and 205.

FIG. 3 shows an operation diagram for an improved dryer. This operation diagram is also described above and is shown in a similar representation as given by FIG. 2.

As explained above, the operation diagram of FIG. 3 is distinguished over the operation diagram of FIG. 2 in that the point 303 at which condensate is separated from the gas (and withdrawn from the closed loop) takes place while the gas is pressurized, whereas in FIG. 2, the condensate is separated from the gas while the gas is not pressurized. Thus, by the improved operation according to FIG. 3, the mass of water or other solvent remaining vaporized (evaporated) in the gas at each drying cycle is reduced. Thus, more water or other liquid is drained from the gas at each drying cycle.

Figure 4:
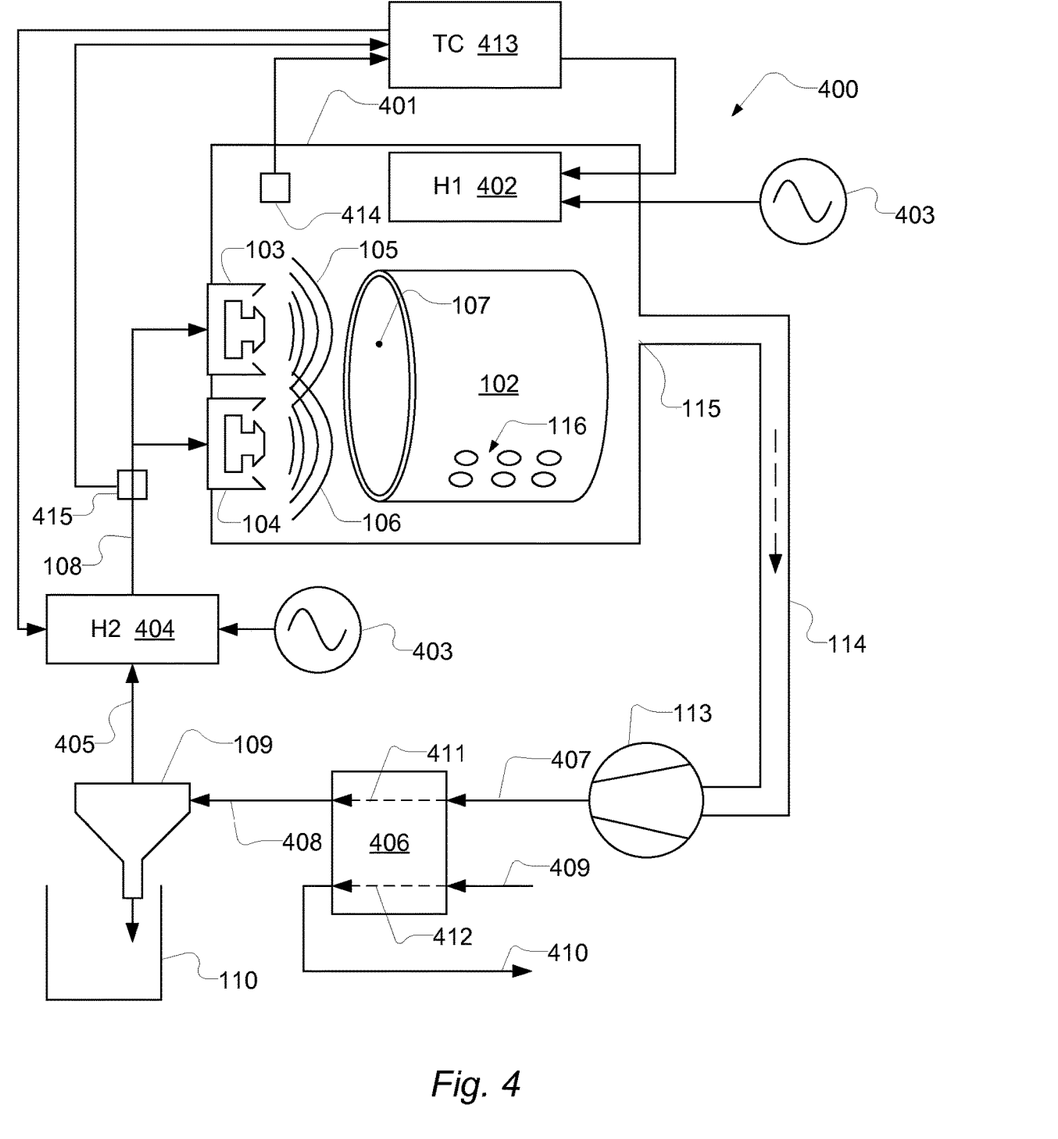
FIG. 4 shows a second embodiment of a dryer.

FIG. 4 shows a second embodiment of a dryer. In this embodiment, the dryer 400 comprises a heater H1, 402 installed inside the dryer chamber 401 and being operatively controlled by a temperature controller TC, 413 to maintain a temperature inside the dryer chamber at a set temperature or within a temperature range. The temperature controller 413 is coupled to one or more temperature sensors 414 arranged at the dryer chamber to sense the temperature inside the dryer chamber 401. The heater 402 may be an electric heater e.g. a heater known from conventional tumble dryers such as a heater operated from a mains supply 403 of electrical power. The heater 402 is installed inside the dryer chamber such that heated air or gas can circulate through perforations 116 as it is known in the art.

The dryer 400 comprises a further heater H2, 404 which is configured to heat compressed gas flowing from the separator 109 to the gas dischargers 103; 104. Compressed gas pipes 108 and 405 deliver the compressed gas from the separator 109 via the heater 404 to the gas dischargers 103, 104. The heater 404 may also be an electric heater operated from a mains supply 403 of electrical power. The heater 404 may be temperature controlled, e.g. by temperature controller 413 coupled to a temperature sensor 415, to maintain the supply of compressed gas at a set temperature or within a temperature range or to maintain temperature inside the dryer chamber at a set temperature or within a temperature range. The temperature sensor 415 is arranged at the compressed gas pipe 108 to sense the temperature of the pressurized gas and/or at the dryer chamber to sense the temperature of the gas in a pressurized state and/or a discharged state.

The heaters H1 and H2; 402 and 404 serve to establish operation points at elevated temperatures, cf. FIG. 3. As examples, elevated temperatures may be temperatures above a room temperature e.g. temperatures above 30 degrees Celsius, but below 40 or 45 degrees Celsius or above 25 degrees Celsius, but below 40 or 45 degrees Celsius. Elevated temperatures may be higher than the examples given here.

To maintain the operation point 303, at which condensate is drained, at a more advantageous position in terms of draining the largest mass of condensate, the compressed air is cooled before or when it reaches the separator. The compressed air may be cooled by a heat exchanger 406. The heat exchanger 406 has a first heat exchanger path 411 sitting in the closed loop air-circulating system between the compressor 113 and the separator 109. The heat exchanger 406 is coupled to the compressor 113 by means of compressed gas pipe 407 and to the separator 109 by means of compressed gas pipe 408.

The heat exchanger 406 may be coupled to cool the compressed gas flowing through the first heat exchanger path 411 by a forced or natural flow of atmospheric air passing the first circuit.

The heat exchanger may, as shown, comprise a second heat exchanger path 412 operatively coupled for exchange of heat energy with the first heat exchanger path. The second circuit is coupled to a supply of a cooling liquid via an inlet 409. The cooling liquid is returned via outlet 410. The cooling liquid may be ground water, tap water or another liquid which may be liquid in an open circuit or a circulated liquid in a closed or semi-closed liquid loop. The flow or temperature of the flow of cooling liquid may be controlled by the temperature controller 413.

In some embodiments, the second heat exchanger path 412 is coupled to supply heat to one or both of the heaters 402 and 404. One or both of the heaters 402 and 404 may then have a heat exchanger circuit in addition to its electrical heater means or as an alternative thereto.

In some embodiments a gas-to-gas heat exchanger (not shown) is installed to extract heat from the compressed gas between the compressor 113 and the separator 109 and to deliver heat to the compressed gas between the separator 109 and the gas dischargers 103, 104. In some aspects thereof the gas-to-gas heat exchanger is coupled to the compressed gas pipe 407 to extract heat from the compressed gas therein.

Figure 5:
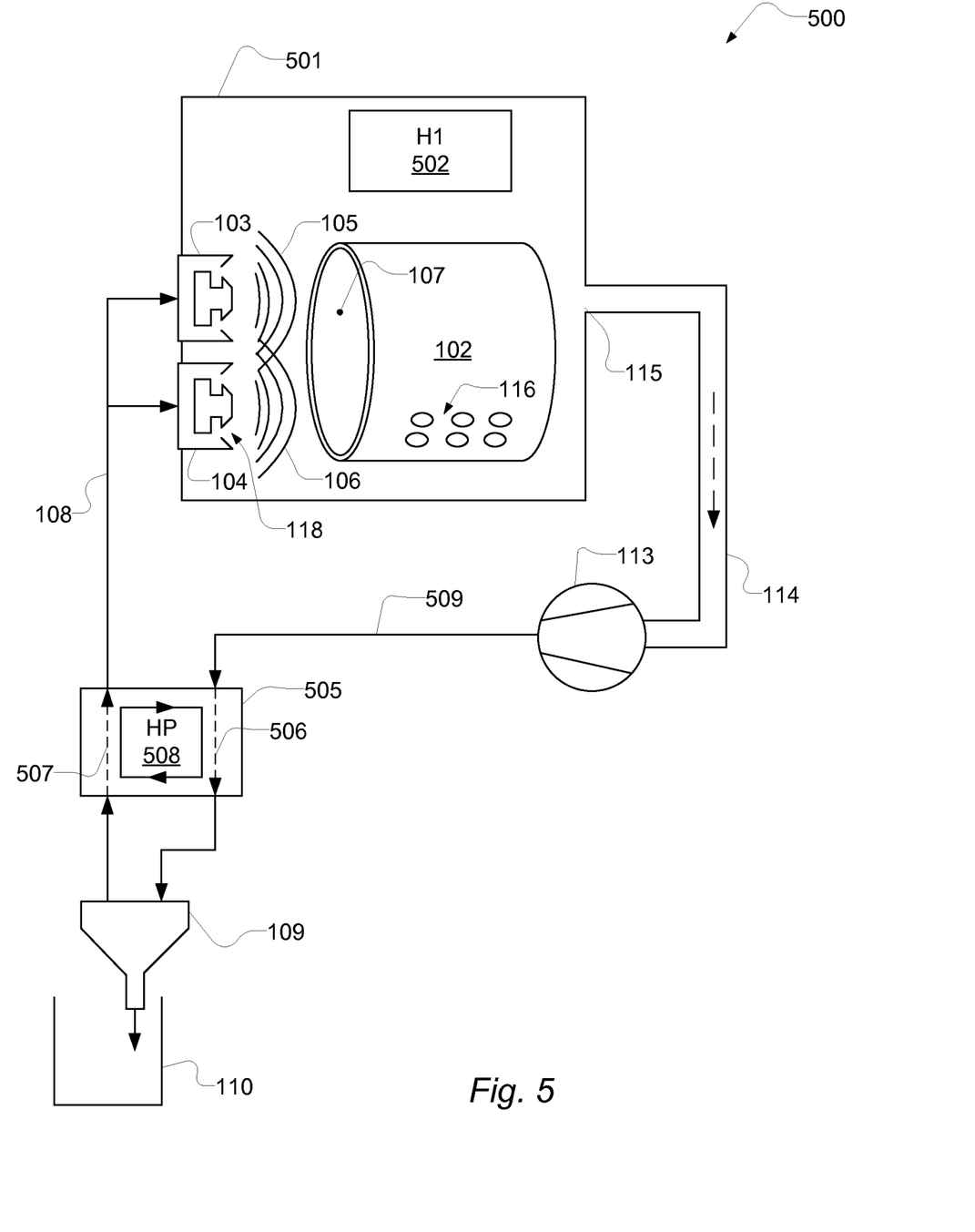
FIG. 5 shows a third embodiment of a dryer.

FIG. 5 shows a third embodiment of a dryer. In this embodiment the dryer is designated by reference numeral 500. Here, the dryer comprises a heat pump 505. The heat pump 505 may an active heat pump comprising a compressor that drives the heat pump circuit. The heat pump comprises a first heat pump gas path 506 sitting in the closed loop gas-circulating system between the compressor 113 and the separator 109 and a second heat pump gas path 507. The second heat pump gas path 507 sits in the closed loop gas-circulating system between the separator 109 and the gas discharger 103;104. The heat pump is configured with a heat pump circuit 508 for extracting heat energy from the first heat pump gas path 506 and delivering heat energy to the second heat pump gas path 507. The heat pump circuit circulates a heat exchanging medium such as a refrigerant.

In some aspects the heat pump is alternatively coupled to deliver heat energy to a heater H1, 502 installed inside the dryer chamber 501.

Alternatively or additionally the heat pump is coupled to deliver heat energy to a heater H1, 502 installed inside the dryer chamber 501 and to the second heat pump gas path 507. A compressed air pipe 509 delivers compressed gas from the compressor 113 to the heat pump 508.

The heat pump 508 may be controlled by a temperature controller e.g. temperature controller 413 described above.

In some embodiments the dryer comprises a condensator arranged between the dryer chamber 101, 401 or 501 and the compressor 113 to drain condensate from the gas, i.e. humid gas, returned via the duct 114 while the (humid) gas is not pressurized. The condensator drains at least some condensate from the gas before being sucked into the compressor. The condensator then supplements the separator 109 in withdrawing condensate from the items to be dried.

Figure 6:
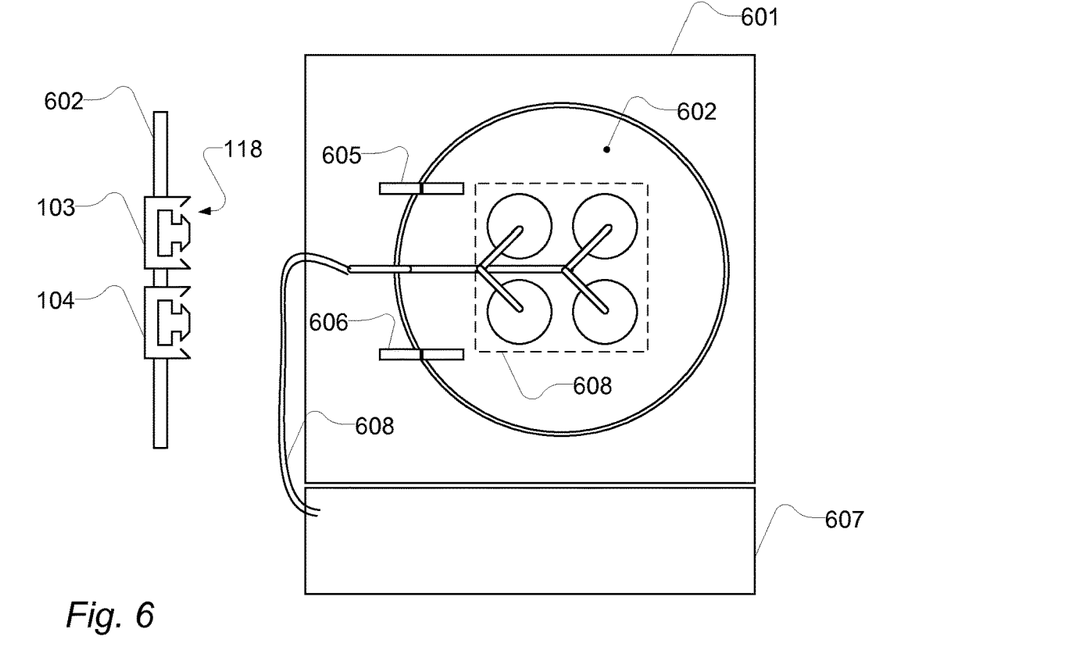
FIG. 6 shows a front-view of a dryer and a side-view of a door for the dryer.

FIG. 6 shows a front-view of a dryer and a side-view of a door for the dryer. The side-view of the door 602 is shown on the left hand side and the front view of the dryer is shown on the right hand side. The door is hinged to the dryer chamber 601 by hinges 605 and 606. The gas dischargers 103 and 104 are installed in or attached to the door 602 with their discharger exits 118 inside the dryer chamber 601, when the door is closed, to provide supply gas which discharges inside the dryer chamber. When the door is closed, it seals the interior of the dryer from the outside, and when open it provides access to the drying chamber 601 for loading or unloading of items into/from the dryer chamber.

One or more of a compressed gas hose and compressed gas tube, collectively designated 608 delivers the supply of compressed air to the gas dischargers 103 and 104.

A housing 607 may accommodate the condenser and compressor and other elements of the dryer.

In some embodiments, the door 602 is configured to be retrofitted to a conventional tumble dryer or other type of dryer. In some embodiments, a unit 608 carrying the gas dischargers is configured to be retrofitted to a conventional tumble dryer door.

Figure 7:
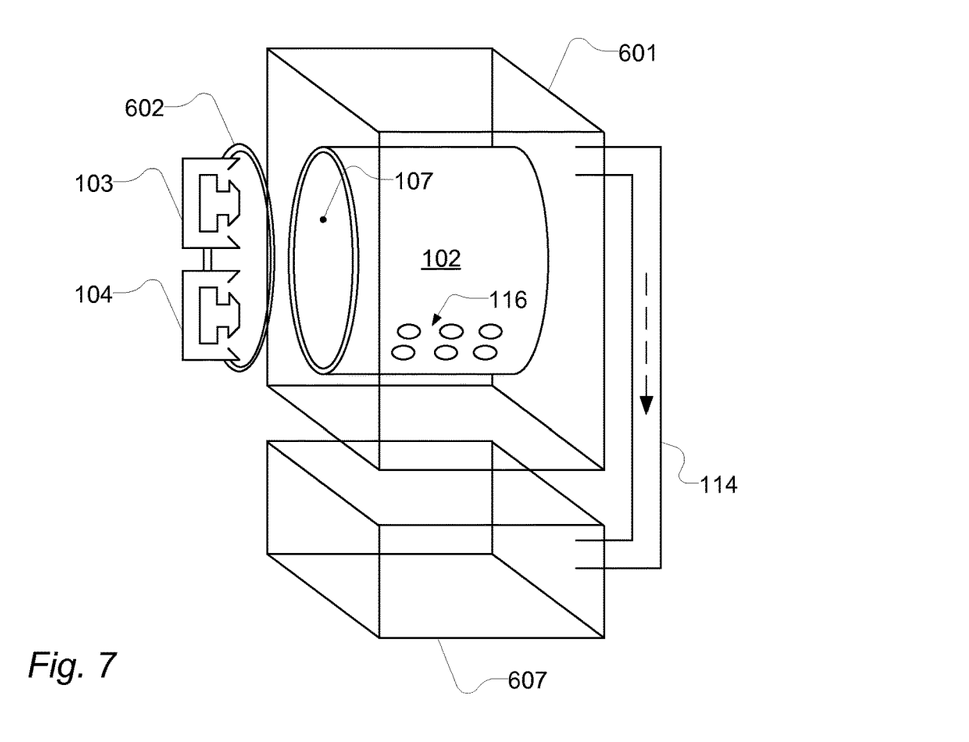
FIG. 7 shows a perspective view of a dryer with a drum.

FIG. 7 shows a perspective view of a dryer with a drum. Here, the door 602 is shown at a distance from the drying chamber 601 to more clearly show the door 602 and the drying chamber 601.

In an embodiment, a method of drying comprises:
arranging one or more items in a dryer chamber 101; 401; 501 with one or more doors, while at least one of the one or more doors is open;
closing the one or more doors to the dryer chamber to prevent a substantial influx of ambient air;
compressing a gas returned via a duct 114 from the dryer chamber 101 to provide a compressed gas;
draining condensate from the compressed gas, while the gas is in a compressed state, to provide compressed supply gas;
discharging the compressed supply gas inside the dryer chamber.

The method establishes a closed loop drying cycle, wherein the gas is recirculated to gradually remove moist from the items in the dryer until a criterion is satisfied. The criterion may comprise e.g. one or more of: a sufficient degree of humidity has been reached; a predetermined period of time has lapsed or a combination thereof.

The door or doors may be of the manual type, e.g. hinged or sliding, or may of the automatic type. In some aspects the method comprises moving the items into the dryer chamber by a conveyor and withdrawing the items from the dryer by the conveyor.

The method of drying may comprise preventing ambient air from mixing with the gas that is recirculated by the closed loop drying cycle. The method may be performed continually during one or more periods of time, such as during at least one period with a duration selected in the range of a few minutes to hours e.g. from 2 minutes or less to 12 hours or more.

As explained above, the compressor may suck the gas returned via the duct 114 via a compressor inlet. The compressed gas may be supplied at a compressor outlet to a compressed gas tube, pipe, hose, or a combination thereof to transfer the compressed gas to a gas-liquid separator.

As a first item there is provided: a dryer, comprising: a dryer chamber (101) coupled to form a closed loop gas-circulating system for circulating gas through the dryer chamber (101); wherein the closed loop gas-circulating system recirculates the gas and comprises: a compressor (113) coupled to receive return gas from the dryer chamber (101) and to compress the return gas to provide compressed gas; a separator (109) sitting in the gas-circulating system for draining condensate from the gas; a gas discharger (103; 104) coupled to receive compressed gas from the compressor (113) and to discharge the compressed gas through a discharger exit (118); characterized in that the separator sits in the closed loop gas-circulating system downstream of the compressor, to receive compressed gas, and upstream of the gas discharger (103;104).

What is claimed is:

1. A dryer comprising:
a dryer chamber and a closed loop gas-circulating system for recirculating gas through the dryer chamber,
wherein the closed loop gas-circulating system comprises:
a compressor in fluid communication with the dryer chamber so as to receive return gas from the dryer chamber and compress the return gas to provide compressed gas;
a separator in fluid communication with the compressor so as to receive the compressed gas from the compressor and drain condensate from the compressed gas; and
a gas discharger in fluid communication with the separator so as to receive the compressed gas from the separator and discharge the compressed gas through a discharger exit to deliver a flow of expanding gas to the drying chamber, which is then delivered to the compressor as the return gas to form a closed loop,
wherein the separator sits in the closed loop gas-circulating system downstream of the compressor, and upstream of the gas discharger.

2. The dryer according to claim 1, wherein the gas discharger is arranged with the discharger exit inside the dryer chamber to provide supply gas which discharges inside the dryer chamber.

3. The dryer according to claim 1, wherein the gas discharger is configured as a sound generator, coupled to receive the compressed gas and therefrom generate high intensity sound waves that is emitted inside the dryer chamber with discharge of the compressed gas through the discharger exit.

4. The dryer according to claim 3, wherein the sound generator is a static siren generating high intensity sound when driven by the compressed gas.

5. The dryer according to claim 1, wherein the separator is a gas/liquid separator.

6. The dryer according to claim 1, wherein the compressor comprises a first displacing member which, by rotation or reciprocation compresses a gas, supplied via a compressor gas intake, by interacting with a stator or second displacing member, which rotates or reciprocates, to compress a volume of gas into the compressed gas, which is supplied via a compressor gas outlet.

7. The dryer according to claim 1, wherein the compressor is configured to generate the compressed gas at a pressure of: above 1.5 bar, above 1.6 bar, above 2 bar, above 4 bar, above 6 bar or above 8 bar.

8. The dryer according to claim 1, comprising a heat exchanger with a first heat exchanger path sitting in the closed loop air-circulating system between the compressor and the separator.

9. The dryer according to claim 8, comprising a second heat exchanger path operatively coupled for exchange of heat energy with the first heat exchanger path; wherein the second heat exchange path is coupled to a supply of a cooling liquid.

10. The dryer according to claim 1, comprising a heater installed inside the dryer chamber and being operatively controlled by a temperature controller to maintain a temperature inside the dryer chamber at a set temperature or within a set temperature range.

11. The dryer according to claim 1, comprising a heater installed at a location downstream of the separator and upstream of the gas discharger to heat compressed air flowing from the separator to the gas discharger, and being operatively controlled by a temperature controller to maintain a temperature inside the dryer chamber at a set temperature or within a temperature range.

12. The dryer according to claim 1, comprising: a heat pump with:
   a first heat pump gas path sitting in the closed loop gas-circulating system between the compressor and the separator; and
   a second heat pump gas path sitting in the closed loop gas-circulating system between the separator and the gas discharger;
   wherein the heat pump is configured with a heat pump circuit for extracting heat energy from the first heat pump gas path and delivering heat energy to the second heat pump gas path.

13. The dryer according to claim 1, comprising a door which, when closed, seals the interior of the dryer chamber from an outside, and which, when open, provides access to the dryer chamber for loading or unloading of items into/from the dryer chamber;
   wherein the gas discharger is installed in or attached to the door with the discharger exit inside the dryer chamber, when the door is closed, to provide supply gas which discharges inside the dryer chamber.

14. The dryer according to claim 1, wherein the dryer chamber accommodates a motorized drum.

15. A door for a dryer and for, when closed, seals the interior of the dryer from an outside, and which, when open, provides access to a dryer chamber for loading or unloading of items into/from the dryer chamber;
   wherein a gas discharger is installed in or attached to the door with a discharger exit inside the dryer chamber, when the door is closed, to provide supply gas which discharges inside the dryer chamber.

16. A method of operating a dryer comprising a dryer chamber and a closed loop gas-circulating system for recirculating gas through the dryer chamber, wherein the closed loop gas-circulating system comprises:
   a compressor in fluid communication with the dryer chamber so as to receive return gas from the dryer chamber and compress the return gas to provide compressed gas;
   a separator in fluid communication with the compressor so as to receive the compressed gas from the compressor and drain condensate from the compressed gas; and
   a gas discharger in fluid communication with the separator so as to receive the compressed gas from the separator and discharge the compressed gas through a discharger exit to deliver a flow of expanding gas to the drying chamber, which is then delivered to the compressor as the return gas to form a closed loop,
   wherein the separator sits in the closed loop gas-circulating system downstream of the compressor, and upstream of the gas discharger,
   said method comprising operating the compressor to generate the compressed gas at a pressure of: above 1.5 bar, above 1.6 bar, above 2 bar, above 4 bar, above 6 bar or above 8 bar.

17. The method according to claim 16, wherein a temperature inside the dryer chamber is kept at a temperature below 50 degrees Celsius or below 42 degrees Celsius or below 37 degrees Celsius.

18. The method according to claim 16, comprising operating the compressor to generate a sound pressure of more than 130 dB or more than 133 dB or more than 136 dB or more than 139 dB.

19. A method of drying, comprising:
   compressing a gas returned via a duct from a dryer chamber to provide a compressed gas;
   draining condensate from the compressed gas, while the gas is in a compressed state, to provide compressed supply gas;
   discharging the compressed supply gas inside the dryer chamber.

20. A method of drying according to claim 19, wherein the compressed gas is generated at a pressure of: above 1.5 bar, above 1.6 bar, above 2 bar, above 4 bar, above 6 bar or above 8 bar.

21. The method of drying according to claim 19, wherein a temperature inside the dryer chamber is kept at a temperature below 50 degrees Celsius or below 42 degrees Celsius or below 37 degrees Celsius.

22. The method of drying according to claim 19, comprising generating a sound pressure of more than 130 dB or more than 133 dB or more than 136 dB or more than 139 dB inside the dryer chamber.

23. The method according to claim 19 wherein food products are provided to the dryer chamber.

24. The method of drying according to claim 19 wherein pharmaceutical substances, pharmaceutical compounds, pharmaceutical ingredients, pharmaceutical products, or pharmaceutical intermediate products are provided to the dryer chamber and dried.

25. The dryer according to claim 4, wherein the sound generator is a Hartmann generator or a Lavavasseur whistle.

26. The dryer according to claim 1, wherein the closed loop is a single closed loop.

\* \* \* \* \*

UNITED STATES PATENT AND TRADEMARK OFFICE
CERTIFICATE OF CORRECTION

PATENT NO. : 10,928,131 B2
APPLICATION NO. : 16/308656
DATED : February 23, 2021
INVENTOR(S) : Niels Krebs Page 1 of 1

It is certified that error appears in the above-identified patent and that said Letters Patent is hereby corrected as shown below:

On the Title Page

Applicant field, delete "Force Technology, Brøndby, DK" and insert -- Sanovo Biosecurity A/S, Odense SØ, DK --

Assignee filed, delete "Force Technology, Brøndby, DK" and insert -- Sanovo Biosecurity A/S, Odense SØ, DK --

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*